June 2, 1959 P. E. HOVGARD 2,888,991
ROTOR HUB FOR HELICOPTER OR THE LIKE
Filed July 26, 1955 2 Sheets-Sheet 1
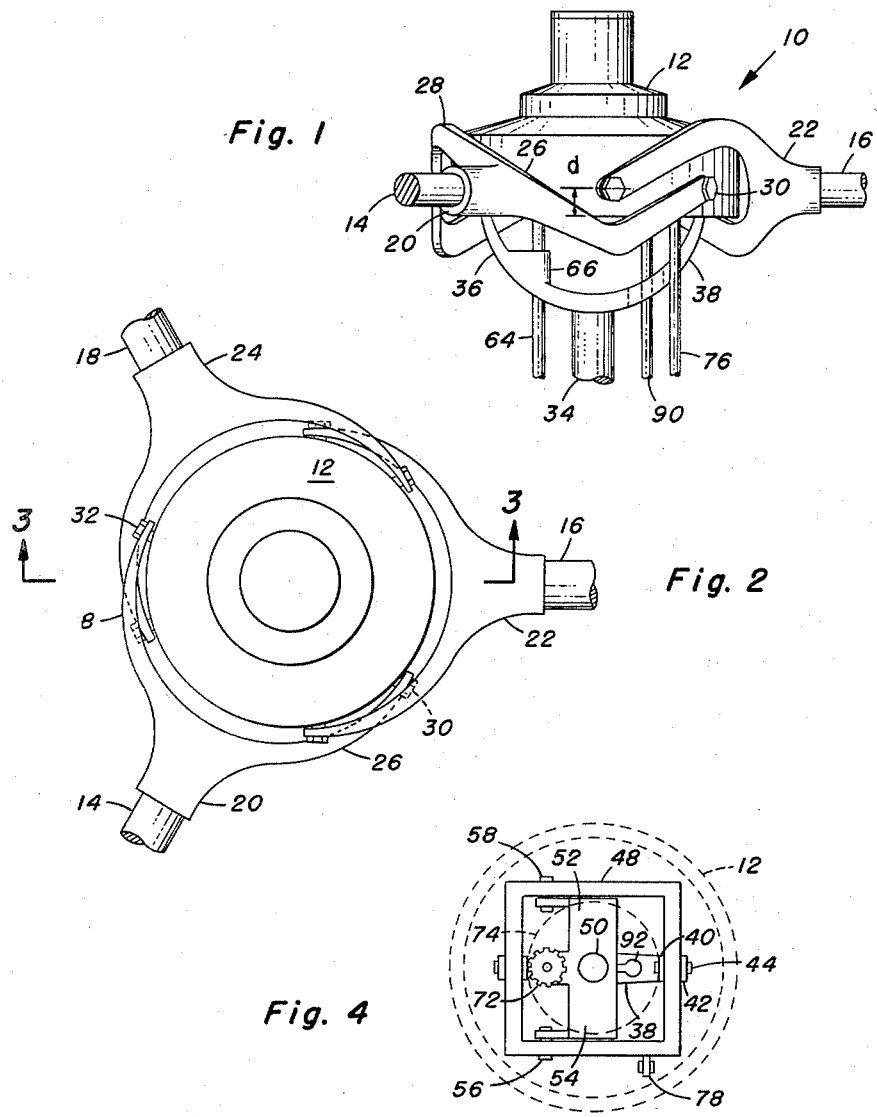
INVENTOR
PAUL E. HOVGARD
BY
ATTORNEYS June 2, 1959 P. E. HOVGARD 2,888,991
ROTOR HUB FOR HELICOPTER OR THE LIKE
Filed July 26, 1955 2 Sheets-Sheet 2

INVENTOR
PAUL E. HOVGARD
BY
ATTORNEYS

United States Patent Office 2,888,991
Patented June 2, 1959

2,888,991
ROTOR HUB FOR HELICOPTER OR THE LIKE

Paul E. Hovgard, Washington, D.C., assignor to the United States of America as represented by the Secretary of the Navy Application July 26, 1955, Serial No. 524,628

11 Claims. (Cl. 170—160.25)

(Granted under Title 35, U.S. Code (1952), sec. 266)

The invention described herein may be manufactured and used by or for the Government of the United States of America for governmental purposes without the payment of any royalties thereon or therefor.

The present invention relates to a rotor hub for helicopters or the like and more particularly to a rotor hub for a helicopter or the like having the flapping axes of the rotor blades vertically close to the control axes.

Prior art helicopters and autogyros have had the defect that the flapping axis of the rotor blades has been vertically spaced above the control axes. This has led to an inherent instability in these known systems, causing much "flying" of the craft, with attendant pilot fatigue. Other known systems are such that the control axes of the blades passed through the axis of rotation of the rotor system. This latter type construction either had no provision for applying power or lacked stability; it also caused excessive pilot fatigue. Pilot fatigue has been sought to be overcome by the use of gyroscopes and servo mechanisms, thus further complicating the system.

The present invention contemplates an arrangement wherein the above noted disadvantages are obviated, due to the placement of the plane of the rotor flapping axes below the control axes.

It is therefore an object of the present invention to overcome the above noted and other deficiencies.

Another object is to provide a rotor system which will be inherently stable, particularly during hovering flight.

A further object of the invention is the provision of a rotor system having control-free stability.

Still another object is to provide a system which will greatly reduce pilot fatigue.

A final object of the invention is the provision of a rotor system which may derive its power from an engine and drive shaft, from drive motors or engines in the rotor blades, or which may be used as autogyrating rotors.

Other objects and many of the attendant advantages of this invention will be readily appreciated as the same becomes better understood by reference to the following detailed description when considered in connection with the accompanying drawings wherein:

Fig. 1 is an elevation of a rotor hub made according to the invention,

Fig. 2 is a plan view of said hub,

Fig. 4 is a plan view, taken from above Fig. 3, with the rotor hub removed.

Figure 3:
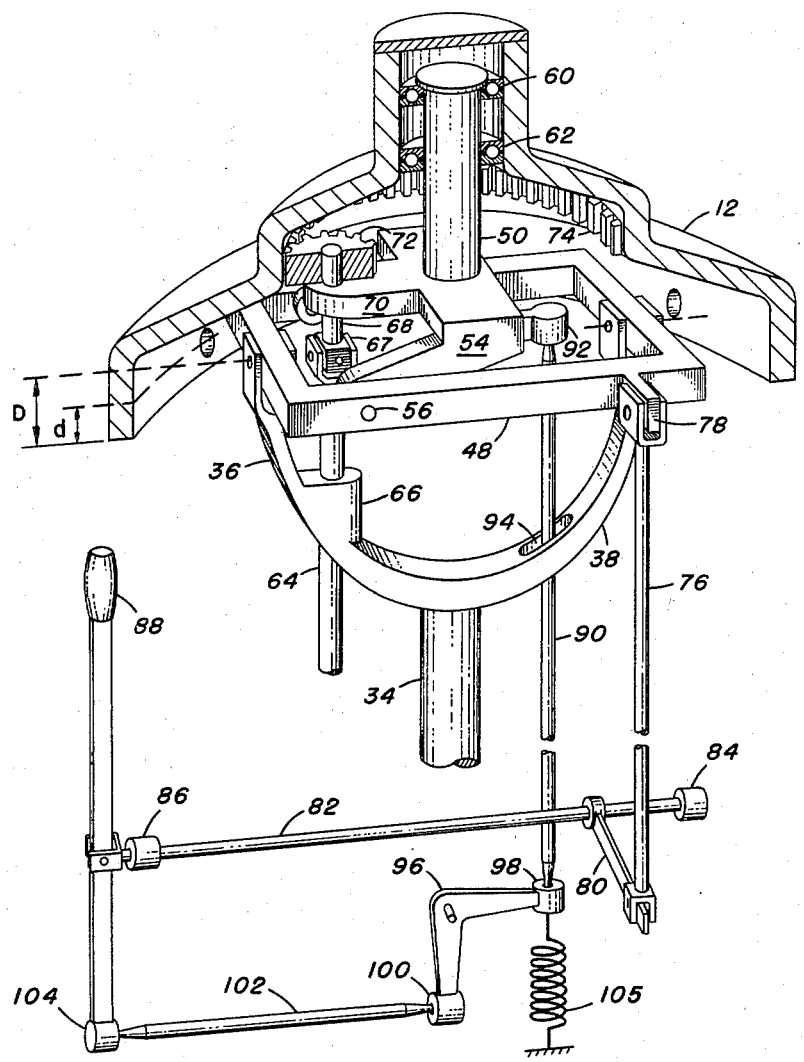
Fig. 3 is a perspective view, partly in cross section, taken on the line 3—3 of Fig. 2.

Referring now to the drawings, wherein like reference characters designate like or corresponding parts throughout the several views, there is shown in Fig. 1 a rotor hub 10 comprising a rotatable hub 12 to which rotor blade supports 14 and 16 are attached. In Fig. 2, it may be seen that there is a third rotor blade support 18, and that the supports 14, 16 and 18 are in turn supported by extension blocks 20, 22 and 24, respectively. Extension block 20 is supported by oppositely extending arms 26 and 28, the ends of which are pivotally attached to hub 12, as by bolts 30 and 32. The other extension blocks 22 and 24 are similarly supported, it being noted that the bolts supporting each extension block are in alignment and constitute the flapping axis of the rotor blade supported by that extension block. The three flapping axes lie in the same plane, and this plane lies a distance $d$ above the lower edge of hub 12.

Referring now to Fig. 3, there is shown a support pylon 34 which is attached at its lower end to the aircraft fuselage, not shown, and which is bifurcated at its upper end into a forwardly extending arm 36 and a rearwardly extending arm 38. Arm 38 is bifurcated at its upper end into two upwardly extending fingers 40 and 42, in which are mounted a pivot pin 44, which rotatably supports the gimbal ring 48. Arm 36 similarly supports gimbal ring 48, which may be seen to be in the form of a hollow square. The pin 44 is in line with the pin of arm 36, and this line constitutes the lateral control axis, which may be seen to be a distance D above the lower edge of hub 12.

Gimbal ring 48 supports the two outwardly diverging feet 52 and 54 of hub axle 50 by pins 56 and 58, the axes of which together form the pitch control axis of the system. The pitch control axis is preferably, although not necessarily, in the same plane as the lateral control axis. Bearings 60 and 62, designed to take thrust and radial loads, are placed between hub 12 and hub axle 50 and permit relative rotary movement between these parts.

Power to rotate the rotor blades may conveniently be supplied by an engine (not shown) housed in the fuselage, transmission being by means of drive shaft 64 rising forwardly of pylon 34 and supported in a bearing 66 of forwardly extending arm 36. Drive shaft 64 terminates in a universal joint 67 which lies in the plane of the pitch control and lateral control axes and at their point of intersection. A final drive shaft 68, supported in a bearing 70 extending from hub axle 50, carries a pinion gear 72 at its upper end, pinion gear 72 meshing with and driving internal ring gear 74 carried by hub 12.

Alternatively, the power may be supplied by means of small engines in the rotor blades, or the system may be used on an autogyro type of aircraft.

Control is effected about the lateral control axis by means of a lateral control rod 76 pivotally attached at its upper end to an ear 78 extending from gimbal ring 48, and at its lower end to an arm 80 extending laterally of torque rod 82. Torque rod 82 is mounted in bearings 84 and 86, and is rotated by movement of joy stick 88.

Control is effected about the pitch control axis by means of pitch control rod 90 which extends through slot 94 in arm 38, and is attached by ball and socket joint 92 to hub axle 50. In the neutral position, the pivotal axis of ball and socket joint 92 lies on the lateral control axis of the system. The lower end of pitch control rod 90 is attached to one arm of a bell crank 96 by means of a universal joint 98. The other arm of bell crank 96 has attached thereto by ball joint 100 a rod 102, the other end of which is connected to joy stick 88 by a ball joint 104. A spring 105 is attached to rod 90 to balance the forces introduced into the system by the offset of the axis of hub axle 50 from the pitch control axis.

In operation, rotation of the blades is obtained by rotation of drive shaft 64, final drive shaft 68, pinion gear 72 and ring gear 74, although the other means noted may be used to rotate the blades. Movement of the blades about the pitch control axis is obtained by forward or rearward movement of joy stick 88, causing up or down movement of pitch control rod 90, which in turn causes hub axle 50 to rotate about pins 56 and 58 in gimbal ring 48. Movement of the blades about the lateral control axis is obtained by lateral movement of the joy stick 88, which causes rotary movement of torque rod 82, and up or down movement of lateral control rod 76. This causes gimbal ring 48, and all the structure supported by it, to be pivoted about the pins carried by the arms 36 and 38 of pylon 34.

It is to be noted that the flapping hinge axis is a distance D-d below the lateral control axis plane. This fact is important because placement of the flapping axis below the lateral control axis automatically leads to smoother control and a stable control system. Thus, the present system is stable in that it is self-correcting when upsetting forces are introduced into it. Thus, a gust from any direction or disturbance of the joy stick will be overcome by the restoring forces naturally induced by the arrangement of parts.

In certain installations, the plane of the flapping hinge may pass through the plane of the longitudinal and transverse axes.

Obviously many modifications and variations of the present invention are possible in the light of the above teachings. It is therefore to be understood that within the scope of the appended claims the invention may be practiced otherwise than as specifically described.

What is claimed is:

1. In a rotating wing aircraft, a support pylon, a hub axle, a hub rotatably mounted on said hub axle, said hub axle being substantially vertical, means connecting said hub axle to said support pylon for tilting about substantially horizontal transverse and longitudinal axes, said horizontal axes lying in substantially the same plane and being substantially perpendicular to each other with said transverse axis being located forward of center of said hub, a plurality of sustaining blades extending outwardly from said hub, each of said blades having a flapping axis, said flapping axes all lying in the same plane, said flapping axis plane being below said horizontal axes.

2. In a rotating wing aircraft, a support pylon, a hub member having an axis of rotation, means mounting said hub member on said pylon for rotation about said axis and for tilting about longitudinal and lateral axes, said longitudinal and lateral axes lying in substantially the same plane with said lateral axis being located forward of said axis of rotation of said hub, said hub member having a plurality of sustaining blades pivotally attached thereto for flapping, the flapping axes lying in the same plane, said plane being below the longitudinal and lateral axes.

3. In a rotating wing aircraft, a support pylon, said pylon being bifurcated at its upper end into two arms, a gimbal ring pivotally supported by said arms for tilting movement about a horizontal axis, a hub axle supported by said gimbal ring for pivotal movement about a horizontal axis transverse to said first mentioned axis, a hub rotatably mounted on said hub axle, and a plurality of blades mounted on said hub for flapping movement about flapping axes, said flapping axes lying in one plane, said plane being below said horizontal axes.

4. In a rotating wing aircraft, a support pylon, a hub, a plurality of sustaining blades pivotally attached to said hub for flapping movement about flapping axes, said flapping axes lying in a single plane, a hub axle supporting said hub for rotation, and means connecting said hub axle to said pylon for tilting movement about two coplanar axes, said means comprising a pair of extensions on said axle, and means pivotally connecting said extensions and said pylon, said plane being below said axes.

5. In a rotating wing aircraft, a support pylon, said pylon being bifurcated at its upper end into two arms, each of said arms being bifurcated at its upper end into two fingers, a gimbal ring pivotally mounted in said fingers, a hub axle pivotally supported by said gimbal ring, and a hub rotatably supported by said hub axle, sustaining blades pivotally attached to said hub for flapping movement about flapping axes, said axes lying in a single plane, said plane lying below the pivot axes of said gimbal ring and hub axle.

6. In a rotating wing aircraft, a support pylon, said pylon being bifurcated at its upper end into two arms, each of said arms being bifurcated at its upper end into two fingers, a gimbal ring pivotally mounted in said fingers, a hub axle having extensions at its lower end, said extensions being pivotally attached to said gimbal ring, and a hub rotatably supported by said hub axle, sustaining blades pivotally attached to said hub for flapping movement about flapping axes, said axes lying in a single plane, said plane lying below the pivot axes of said gimbal ring and hub axle.

7. In a rotating wing aircraft, a support pylon, a hub axle supported on said support pylon for tilting movement about transverse and longitudinal axes, a hub rotatably mounted on said axle above said axes, said hub having a downwardly and outwardly extending skirt, a plurality of sustaining blades pivotally attached to said hub skirt for flapping, the flapping axes of said blades lying below said transverse and longitudinal axes.

8. In a rotating wing aircraft, a support pylon, a hub axle supported on said support pylon for tilting movement about transverse and longitudinal axes, said axes lying in a single plane, a hub having sustaining blades pivotally attached thereto being rotatably mounted on said axle above said plane, said transverse axis being located forward of center of said hub, an upwardly extending drive shaft, a universal joint at the upper end of said drive shaft, said universal joint lying at the intersection of said axes, a final drive shaft connected to and extending upwardly from said universal joint and having a pinion gear at its upper end, and an internal ring gear carried by said hub, said pinion gear meshing with said ring gear.

9. The apparatus of claim 8, and an extension on said hub axle, said final drive shaft passing through said extension and being rotatably supported thereby.

10. In a rotating wing aircraft, a support pylon, a gimbal ring pivotally mounted on said support pylon for tilting movement about a first axis, a hub axle pivotally mounted on said gimbal ring for tilting movement about an axis transverse to and intersecting said first axis, a hub having sustaining blades pivotally attached thereto being rotatably mounted on said axle above said axes, said transverse axis being located forward of center of said hub, an upwardly extending drive shaft, a universal joint at the upper end of said drive shaft, said universal joint being at the point of intersection of said axes, a final drive shaft connected to and extending upwardly from said universal joint and having a pinion gear at its upper end, and an internal ring gear carried by said hub and meshing with said pinion gear.

11. In a rotating wing aircraft, a support pylon, said pylon having its upper end bifurcated into two upwardly extending arms, a hub axle, means supporting said hub axle on said arms for tilting movement about longitudinal and transverse axes, a hub having sustaining blades pivotally attached thereto being rotatably supported by said axle, said transverse axis being located forward of center of said hub, an upwardly extending drive shaft, a passage through one of said arms, said drive shaft passing through said passage, and means connecting said drive shaft to said hub.

References Cited in the file of this patent

UNITED STATES PATENTS

| 2,110,638 | Synnestvedt | Mar. 8, 1938 |
| 2,136,165 | Daland | Nov. 8, 1938 |
| 2,263,568 | Campbell | Nov. 25, 1941 |
| 2,264,942 | Larsen | Dec. 2, 1941 |
| 2,457,429 | Young | Dec. 28, 1948 |
| 2,648,387 | Doman | Aug. 11, 1953 |

FOREIGN PATENTS

| 476,596 | Great Britain | Dec. 13, 1937 |
| 1,024,980 | France | Jan. 21, 1953 |